Figure 1:
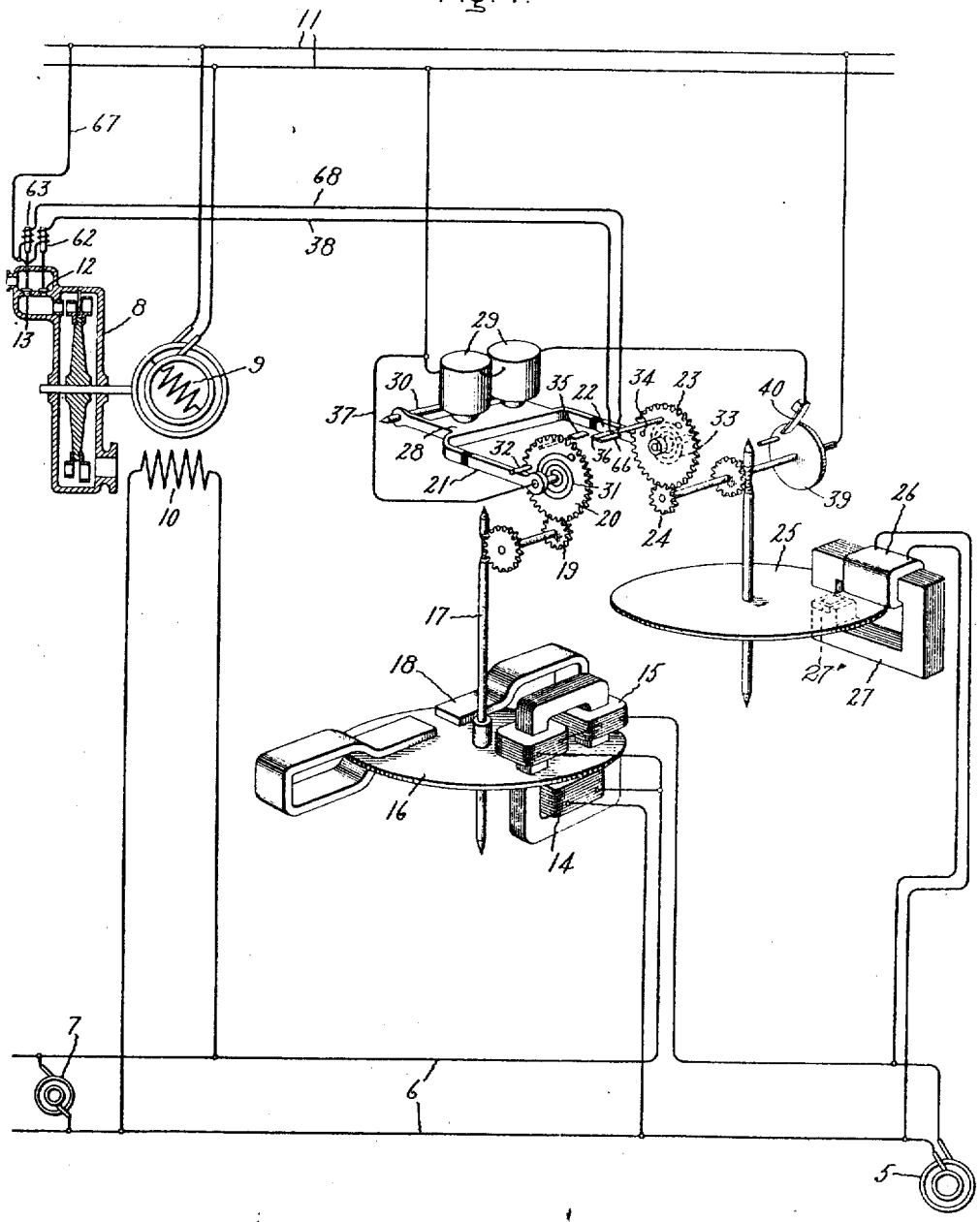

K. A. PAULY.
APPARATUS FOR CONTROLLING THE ENERGY SUPPLY FOR PEAK DEMANDS.
APPLICATION FILED JULY 31, 1914.

1,201,619.

Patented Oct. 17, 1916.
2 SHEETS—SHEET 1.

Witnesses:
Chas. B. Stokes
J. Ellis Glen

Inventor:
Karl A. Pauly,
by Albert G. Davis
His Attorney.

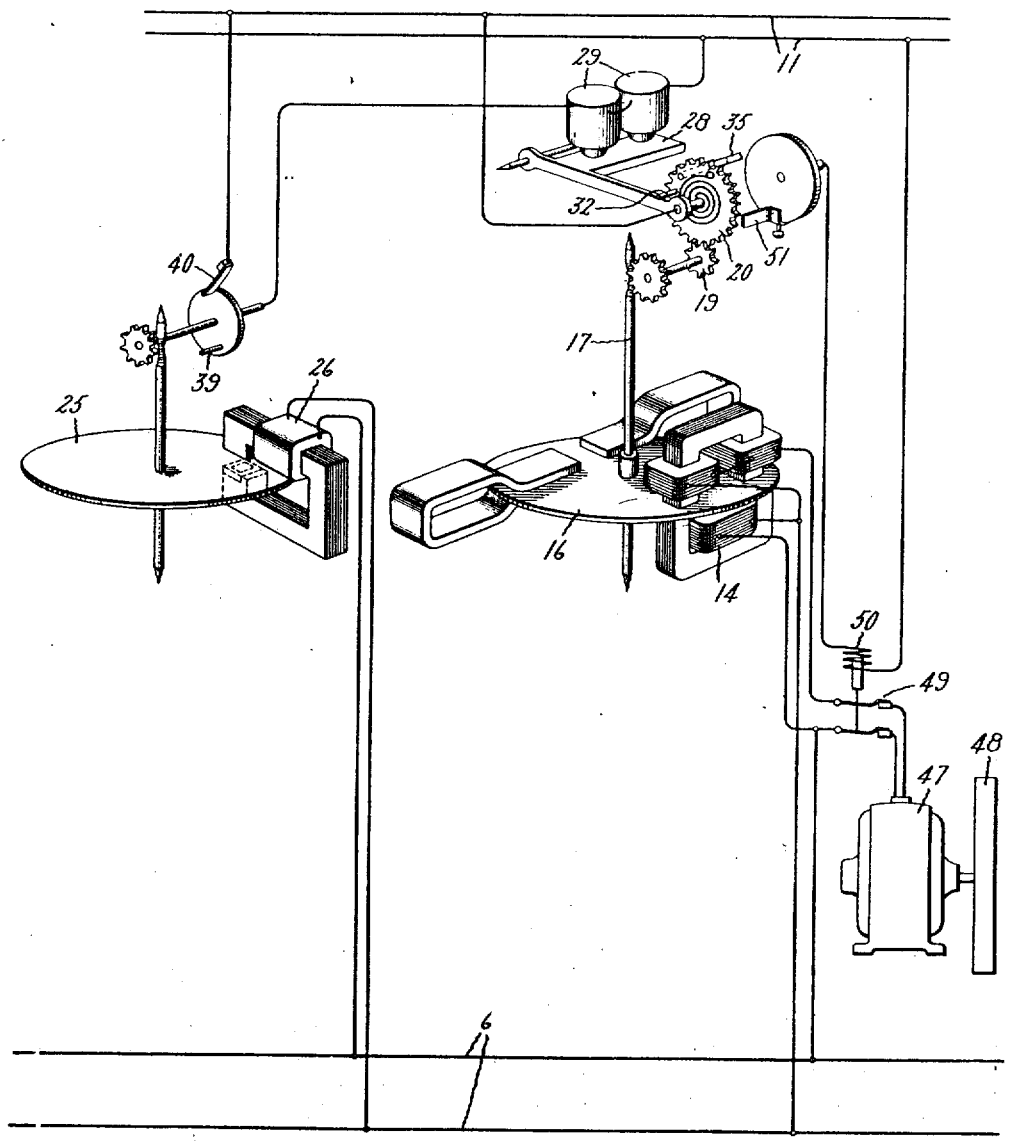

UNITED STATES PATENT OFFICE.

KARL A. PAULY, OF SCHENECTADY, NEW YORK, ASSIGNOR TO GENERAL ELECTRIC COMPANY, A CORPORATION OF NEW YORK.

APPARATUS FOR CONTROLLING THE ENERGY-SUPPLY FOR PEAK DEMANDS.

1,201,619.   Specification of Letters Patent.   Patented Oct. 17, 1916.

Application filed July 31, 1914. Serial No. 854,277.

*To all whom it may concern:*

Be it known that I, KARL A. PAULY, a citizen of the United States, residing at Schenectady, county of Schenectady, State of New York, have invented certain new and useful Improvements in Apparatus for Controlling the Energy-Supply for Peak Demands, of which the following is a specification.

My invention relates to apparatus for controlling the energy supply for the peak demands of an electrical installation, and particularly to apparatus for relieving a principal source of energy supply of the burden of peak loads.

The object of my invention is to provide a novel and improved apparatus for controlling the energy supply of an electrical installation during the periods of peak demands.

More particularly the object of my invention is to provide a novel and improved apparatus for limiting the average demand made by an electrical installation upon a principal source of energy supply.

More specifically the object of my invention is to maintain the average demand made by an electrical installation upon a principal source of energy supply below a predetermined value.

Peak loads and particularly sudden or intermittent peaks such as occur from violent fluctuations of load are very objectionable to a central generating station because of the large amount of apparatus required to take care of the peak demands. The central station is, therefore, greatly interested in equalizing a consumer's demand and particularly in eliminating peak demands. To this end, a common form of tariff contract provides an excess charge in the nature of a penalty whenever the consumer's demand upon the central generating station exceeds a predetermined value. Usually the contract specifies a maximum average demand which must not be exceeded if the consumer is to obtain the most favorable tariff rate. The consumer's average demand may be determined as the amount of energy consumed in a predetermined time interval, or as the time required to consume a predetermined quantity or interval of energy. In either case the average demand is the average rate of energy consumption during the interval of measurement. Thus a consumer may by this form of contract be given a decidedly attractive tariff rate for the energy used as long as his average demand does not exceed a predetermined amount. If the average demand does exceed the contract maximum demand the consumer is penalized by an excess charge.

A consumer whose energy is supplied under a tariff contract of the above character is obviously desirous of maintaining his average demand below the contract maximum. The novel and improved apparatus of my invention is designed to be used in such instances, and comprises means adapted to relieve the principal source of energy supply, as for example the central generating station, of the burden of the peak demand when the average demand of the installation is in excess of the allowed contract maximum demand.

My invention thus broadly consists in providing an apparatus in which an action responsive to the average demand of an electrical installation is obtained and by which suitable means are controlled for maintaining the average demand below a predetermined value. In its more complete form my invention consists in providing an apparatus in which an action substantially proportional to the average demand of an electrical installation upon a principal source of electric energy is produced during each of a plurality of successive intervals and which controls a suitable auxiliary source of energy for supplying energy therefrom to the installation when the average demand made by the installation upon the principal source of electric energy exceeds a predetermined value.

The novel features which I believe to be patentably characteristic of my invention are definitely indicated in the claims appended hereto.

The principle of operation of apparatus embodying my invention will be understood from the following description taken in connection with the accompanying drawings, in which:

Figures 1 and 2 are diagrammatic views in perspective of two forms of apparatus embodying my invention.

As heretofore stated the average demand of a consumer's installation may be obtained by measuring the amount of energy consumed during a predetermined time interval, or by measuring the time required to consume a predetermined quantity or interval of energy. In either case the demand is measured during each of a plurality of successive intervals of reference, whether of time or energy, and the average demand during any interval of reference is the average rate of energy consumption during that interval.

While the apparatus which I have illustrated in the accompanying drawings to explain my invention is particularly designed to obtain an action responsive to the consumer's demand in terms of the amount of energy consumed during a predetermined time interval, it will be evident to those skilled in the art that my invention is equally applicable to an apparatus which obtains an action responsive to the demand in terms of the time required to consume a predetermined quantity of energy. It, accordingly, will be understood that broadly my invention consists in providing an apparatus for obtaining an action responsive to the average demand made by an electrical installation upon a source of energy supply and in providing means in operative relation thereto for maintaining this average demand below a predetermined value.

Referring to Fig. 1 of the drawings, there is diagrammatically illustrated a principal source of electric energy supply 5, such as for example a central generating station, supplying electric energy over conductors 6 to the translating devices 7 of a consumer's installation. The consumer has in operative relation to his installation an auxiliary source of energy supply which is adapted to assist or entirely replace the principal source of electric energy supply whenever the average demand over a predetermined time interval exceeds the contract maximum demand. The auxiliary source of energy supply may be of any desired character, such as a turbine or gas-engine-driven dynamo, a hydro-electric dynamo, suitable storage batteries, a flywheel equalizer, or any other convenient or suitable source of energy supply. In Fig. 1 of the drawings, I have diagrammatically represented by way of example a turbine-driven alternator comprising an elastic fluid turbine unit 8 directly connected to the rotating field 9 of the alternator, and a stator or armature 10 connected to the conductors 6 and adapted to supply energy to the translating devices 7. The field of the alternator is adapted to be excited from the conductors 11 of a direct current source of supply. Steam admission to the turbine is controlled by electromagnetic valves 12 and 13. These valves are designed to be opened and to permit the passage of steam from the steam chest into the turbine upon the energization of their respective coöperating coils 62 and 63, as will be explained in greater detail hereinafter.

An electric meter of the motor type having a rotatable shaft is connected to the system and is adapted to integrate the energy supplied to the consumer's installation by the principal source of energy supply 5. In the drawings I have represented an induction watthour meter of the well known type. This meter comprises a magnetic core carrying a potential coil 14 and an oppositely positioned magnetic core carrying series coils 15. A metallic disk armature 16 is secured to a pivotally mounted shaft 17 and is positioned to rotate in the air gap between the potential and series magnetic cores in the well understood manner. Rotation of the disk armature 16 is retarded by the permanent damping magnets 18 in the usual manner, so that the speed of rotation of the armature 16 is proportional to the rate of supply of energy to the consumer's installation by the source of energy supply 5.

The rotatable shaft 17 is directly connected to a gear 19. A gear 20 carried by one arm 21 of a bifurcated member is adapted to mesh with the gear 19. The other arm 22 of the bifurcated member carries a gear 23 adapted to mesh with a gear 24. The gear 24 is time-actuated, that is to say the gear is continuously rotated at substantially uniform speed by the rotating element 25 of a constant speed motor. As shown, the constant speed motor is of the shaded pole type and comprises a magnetic core 27 having an exciting coil 26 connected across the conductors 6 and a short-circuited shading coil 27' covering a portion of one of the pole faces. The rotating element 25 is of the usual disk armature type and is operatively positioned in the air gap of the magnetic core of the constant speed motor. Any suitable constant speed driving mechanism may be employed in place of the constant speed motor which I have illustrated, such for example as a clock movement, or any other mechanism which will drive the gear 24 at substantially uniform speed so that the movement of the gear will be, in effect, time-actuated.

The arms 21 and 22 of the bifurcated member are connected to and suitably insulated from the armature 28 of a pair of electromagnets 29. The armature 28 is secured to a pivoted shaft 30 and the construction is such that when the electromagnets 29 are energized the armature is raised thereby lifting the gears 20 and 23 out of mesh with the gears 19 and 24 respectively.

A spring 31 is secured at one end to the gear 20 and at the other end to a fixed part of the apparatus and is adapted to be energized or wound up by the rotation of the gear 19 when the gear 20 is in mesh therewith. A pin 32 is secured to the gear 20 and is adapted to engage with the arm 21 to determine the initial position of the gear 20. It will be obvious that when the gear 20 is raised out of mesh with the gear 19 that the spring 31 operates to return the gear to its initial position with the pin 32 engaging the arm 21. A spring 33 is similarly secured at one end to the gear 23 and at the other end to a fixed part of the apparatus and is arranged to be energized by the rotation of the gear 24 when the gear 23 is in mesh therewith. A pin 34 is also secured to the gear 23 and engaging with the arm 22 determines the initial position of the gear.

The gear 20 carries a contact 35, while the gear 23 carries contacts 36 and 66 each arranged for coöperative engagement with the contact 35. The contacts 36 and 66 are insulated from each other and each has a path of movement substantially coincident with the path of movement of the contact 35. When the gears 20 and 23 are in their respective initial positions the contact 36 is slightly in advance of and just out of operative engagement with the contact 35. A conductor 37 electrically connects the contact 35 to one of the direct current line-conductors 11. A conductor 67 electrically connects the other line-conductor 11 to one terminal of each of the relay coils 62 and 63. The other terminals of the relay coils 62 and 63 are electrically connected by conductors 38 and 68 to the time-actuated contacts 36 and 66 respectively.

A circuit closing device is included in the electric circuit of the magnets 29 and is adapted to be operated at predetermined equal time intervals. This circuit closing device comprises a rotatable contact 39, adapted to be driven at constant speed by the rotating element 25 of the constant speed motor, and a coöperating fixed contact 40. It will thus be seen that the movable contact 39 engages its coöperating contact 40 at equal time intervals, for example once every minute, and thus energizes the electromagnets 29, thereby raising the armature 28 and thus raising the gears 20 and 23 out of mesh with the gears 19 and 24, respectively.

The operation of the apparatus illustrated in Fig. 1 is as follows:—The contacts 36 and 66 start from their respective initial positions, slightly in advance of the contact 35, and rotate at a uniform speed. The contact 35 simultaneously starts from its initial position and follows the contact 36 at a speed proportional to the rate of supply of electric energy to the translating devices 7 by the primary source of supply 5. Since the initial position of the contact 36 is slightly in advance of the contact 35, the contact 35 must rotate slightly faster than the contact 36 if it is to overtake and engage the latter contact. The speed of rotation of the contact 36 is determined by the contract maximum demand, and is such that the extent of movement of the contact from its initial position is at any instant during a predetermined interval a measure of the maximum amount of energy the consumer could have used up to that instant of the interval, if his rate of consumption of energy is to remain constant for the entire interval and his contract maximum demand unexceeded. If, therefore, the rate of energy supply to the consumer's installation by the source 5 is uniform and such that the total energy supply for the predetermined time interval is substantially equal to the contract maximum demand, the contacts 36 and 35 will rotate at the same speed and will not engage. If the rate of energy supply to the consumer's installation is such that the amount of energy supplied is at any instant smaller than the amount that might have been taken in the same time at a uniform rate for the entire interval without exceeding the contract maximum demand, the contact 35 will rotate slower than the contact 36, and hence the contacts will not engage. If, however, the amount of energy taken by the installation during any portion of the predetermined time interval is greater than could be taken during the same time at a uniform rate for the entire time interval without exceeding the contract maximum, the contact 35 will rotate faster than the contact 36, and thus the two contacts will engage, thereby energizing the relay coil 62 and opening the steam admission valve 12 of the turbine.

The turbo-alternator normally runs idle or floats upon the system and supplies no energy to the translating devices 7 of the installation. When the contact 35 engages with the contact 36 the steam valve 12 is opened, whereupon the turbo-alternator assumes a portion of the load and furnishes energy to the translating devices 7 of such an amount that the primary source of energy supply 5 is relieved of the burden of this peak demand. The auxiliary source of energy supply may if desired relieve the primary source of energy supply to such an extent that the contact 35 will not under any condition travel faster than the contact 36 as long as the two contacts are in engagement, and consequently the primary source of energy supply will not be called upon to furnish an amount of energy for the interval in excess of the maximum contract value. In the accompanying drawings, however, I have shown two stages in the assumption of the peak load by the auxiliary source of energy. If the demand is of such a character that the contact 35 travels faster than and consequently overtakes the contact 36 the turbo-alternator will carry a definite amount of the total load of the installation, determined by the amount of steam admitted by the opening of the valve 62. If the demand is a heavy one the contact 35 will continue to travel faster than the contact 36 and will overtake the contact 66, thereupon opening the steam admission valve 13. This additional admission of steam causes the turbo-alternator to carry a larger proportion of the total load, so that the principal source of energy supply will not be called upon to furnish energy in excess of the contract maximum demand. The assumption of the load by the auxiliary source of energy in a plurality of stages results in increasing the load thrown upon the auxiliary source as the energy consumption in the installation increases. This prevents overloading of the auxiliary source for peaks of short duration, but where a peak exists for a considerable length of time, the longer it lasts the greater will be the load thrown upon the auxiliary source. The series of time actuated contacts is of such width that the meter-actuated contact can not under any condition pass beyond and out of engagement therewith, so that once the auxiliary source is thrown into service it will continue to supply energy for the remainder of that interval, unless the average demand made upon the principal source of energy supply falls below the predetermined value.

At the end of each equal time interval the electromagnets 29 are energized thereby raising the gears 20 and 23 out of mesh with the gears 19 and 24 respectively, whereupon the former gears are returned to their respective initial positions by means of the springs 31 and 33 respectively. The return of the gears 20 and 23 to their respective initial positions results in deënergizing which ever of the energizing coils of the electromagnetic steam admission valves that load conditions may have caused to be in an energized state at the end of the time interval. It will thus be seen that the auxiliary source of energy supply is always out of service at the beginning of each predetermined time interval. The time interval may obviously be of any desired length, and is determined by the character of the installation and by local conditions, and ordinarily is some substantially time interval from one minute to one hour. It will of course be understood that the engagement of the meter-actuated contact 35 with the time-actuated contacts 36 and 66 may be employed in any suitable way to effect the assumption of any desired portion of the total load of the installation by the auxiliary source of supply, and that I have shown the control of the steam admission to the turbine upon the engagement of these contacts merely by way of example for the purpose of explaining the principle of my invention.

It will be evident from the foregoing description that I have provided an apparatus which will limit the amount of energy supplied by the principal source during any time interval to that amount allowed by the consumer's contract. When at any instant during any time interval the total amount of energy supplied during the preceding fraction of the interval is in excess of what the consumer may take during that same fraction of the interval without exceeding his contract maximum demand, the apparatus operates to throw the load on the auxiliary source of energy supply. It will be obvious that the value of the average load at which the auxiliary source is brought into operation may be readily adjusted by varying the speed of the time-actuated contact 36, which can be conveniently accomplished by changing the gear ratio of the gears 23 and 24.

In Fig. 2 of the drawings, I have illustrated a slightly modified form of the apparatus. Certain installations possess a fly wheel capacity which is capable of carrying the load of the installation for a considerable length of time. In these installations the source of energy supply can be interrupted for a certain substantial time interval without interfering with the operation of the apparatus of the installation. The apparatus illustrated in Fig. 2 is particularly adapted for use in such installations. By the apparatus of Fig. 2, the energy supplied to the installation by the principal source of supply is integrated during each of the predetermined equal time intervals, and whenever the amount of energy supplied and integrated exceeds the contract maximum demand for that period, the installation is cut off from the principal source of supply and the load is carried by the fly wheel capacity of the installation. This will be best understood by reference to Fig. 2 of the drawings. Conductors 6 supply energy from a principal source of electric energy supply to the translating device 47. I have illustrated a motor as the translating device having operatively connected thereto a fly wheel 48. The fly wheel is so designed that it will carry the load connected to the motor for a substantial time interval, and so the motor may be electrically disconnected from its supply without interfering with the operation of the load. A solenoid operated switch 49 having a relay coil 50 controls the circuit of the motor. When the relay coil is energized, the switch is opened and the motor is electrically disconnected from its source, otherwise the switch is normally closed.

An induction watthour meter of the same type as described in connection with Fig. 1 is connected to the installation and integrates the amount of energy supplied by the principal source to the motor 47. The rotatable shaft of the meter drives the gear 20 and contact 35 in precisely the same manner as in the apparatus of Fig. 1. In place of the time actuated contact of the apparatus of Fig. 1, I employ in the apparatus of Fig. 2 an adjustable stationary contact 51. The contact 51 is positioned in the path of movement of the contact 35, and when these contacts engage the relay coil 50 is energized from the conductors 11 of the direct current source of supply. The circuit of the electromagnets 29 is closed at equal time intervals by a constant speed motor, just as in the apparatus of Fig. 1.

The operation of the apparatus of Fig. 2 is as follows:—The contact 35 starts at the beginning of each time interval from its initial position and moves toward the contact 51 at a rate proportional to the rate of supply of energy to the motor 47. The contact 51 is adjusted to occupy the desired position with respect to the initial position of the contact 35 and in accordance with the predetermined contract maximum demand. If the total amount of energy supplied to the motor during the predetermined time interval is just less than the contract maximum demand, the contact 35 will travel just to, but not into operative engagement with, the contact 51. The relay coil 50 will thus not be energized and the contact 35 will be returned to its initial position by the energization of the electromagnets 29 at the end of the time interval. When, however, the total amount of energy supplied to the motor 47 substantially equals the contract maximum demand for the predetermined time interval, the contact 35 will engage with the contact 51 and thereby energize the relay coil 50 and open the switch 49. The switch 49 is maintained in its open position for the remainder of that particular time interval and the load connected to the motor is carried by the inertia of the fly wheel 48. At the end of the time interval the electromagnets 29 are energized and the contact 35 returned to its initial position. The cycle of operation is then repeated. It will thus be seen that the supply of energy to the installation from the principal source of supply never exceeds a definite predetermined amount during any one of the predetermined equal time intervals. Whenever the load on the installation is such that the predetermined contract amount of energy is consumed before the end of the time interval the energy supply from the principal source is interrupted and the load of the installation is carried by the fly wheel energy. In this manner peak demands are very satisfactorily taken care of without exceeding the maximum demand allowed by the contract upon the principal source of energy supply.

I have explained my invention by diagrammatically illustrating and describing certain specific embodiments thereof, but it will be understood that the invention may be embodied in many other forms than that shown and described. I, accordingly, do not wish to be restricted to the particular forms and constructions disclosed herein by way of example for the purpose of setting forth my invention in accordance with the patent statutes. The terms of the appended claims are, therefore, not restricted to the precise structures disclosed but are intended to cover all changes and modifications within the spirit and scope of my invention.

What I claim as new and desire to secure by Letters Patent of the United States, is:—

1. In an electrical installation, a source of electric energy adapted to supply energy to said installation, an electric meter having a rotatable shaft and adapted to integrate the amount of energy supplied to said installation by said source, a rotatably mounted contact having an initial position and adapted to be rotated by said shaft, a second movable contact having an initial position and a path of movement substantially coincident with that of said first mentioned contact, means for moving said second contact at a substantially uniform speed, means whereby said contacts are intermittently returned to their respective initial positions, and a relay adapted to have its electric circuit controlled by the engagement of said contacts.

2. In an electrical installation, a principal source of electric energy adapted to supply energy to said installation, an auxiliary source of energy supply, said principal source of electric energy being normally employed to supply the total energy demand of said installation, while said auxiliary source of energy normally supplies substantially no energy to said installation, means for integrating the amount of energy supplied to said installation by said principal source during each of a plurality of equal time intervals, and means including said last mentioned means whereby the load of said installation is thrown upon said auxiliary source of energy supply when the amount of energy supplied by said principal source to said installation during any one of said equal time intervals exceeds a predetermined value.

3. In an electrical installation, a source of electric energy adapted to supply energy to said installation, an electric meter having a rotatable shaft and adapted to integrate the amount of energy supplied to said installation by said source, a movable member having an initial position and adapted to be moved by said shaft, means whereby said member is intermittently returned to its initial position, a second movable member having an initial position and a path of movement substantially coincident with that of said first mentioned member, means for moving said second member at a substantially uniform speed, means whereby said member is intermittently returned to its initial position, and means actuated by the engagement of said members for limiting the amount of energy supplied to said installation by said source.

4. In an electrical installation, a principal source of electric energy adapted to supply energy to said installation, an auxiliary source of energy adapted to supply energy to said installation, said principal source of electric energy being normally employed to supply the total energy demand of said installation while said auxiliary source of energy normally supplies substantially no energy to said installation, means for obtaining an action responsive to the average demand made by said installation upon said principal source of electric energy, and means including said last mentioned means whereby energy is supplied to said installation by said auxiliary source when the average demand made by said installation upon said principal source of electric energy exceeds a predetermined value.

5. In an electrical installation, a source of electric energy adapted to supply energy to said installation, an electric meter having a rotatable shaft and adapted to integrate the amount of energy supplied to said installation by said source, a movable member having an initial position and adapted to be moved by said shaft, a second movable member having an initial position and a path of movement substantially coincident with that of said first mentioned member, means for driving said second member at a substantially uniform speed, means whereby said members are intermittently returned to their respective initial positions, and means actuated by the engagement of said members for preventing the supply of energy in excess of a predetermined amount to said installation by said source during any one of said intervals.

6. In an electrical installation, a principal source of electric energy adapted to supply energy to said installation, an auxiliary source of energy also adapted to supply energy to said installation, and means for causing said auxiliary source of energy to supply energy to said installation whenever the average demand made by the installation upon said source over any fraction of a predetermined interval attains a predetermined value.

7. In an electrical installation, a principal source of electric energy adapted to supply energy to said installation, an auxiliary source of energy also adapted to supply energy to said installation, said principal source of electric energy being normally employed to supply the total energy demand of said installation while said auxiliary source of energy normally supplies substantially no energy to said installation, means for obtaining an action responsive to the average demand made by said installation on said principal source of energy over any fraction of a predetermined interval, and means including said last mentioned means for causing said auxiliary source of energy to supply energy to said installation whenever the average demand made by the installation upon said principal source of electric energy over any fraction of such a predetermined interval attains a predetermined value.

8. In an electrical installation, a principal source of electric energy adapted to supply energy to said installation, an auxiliary source of energy also adapted to supply energy to said installation, means for obtaining an action responsive to the average demand made by said installation on said principal source of energy over any fraction of a predetermined interval, and means including said last mentioned means for causing said auxiliary source of energy to supply energy to said installation during any part of such a predetermined interval that the average demand made by the installation upon said principal source of energy during the preceding fraction of such interval attains a predetermined value.

9. In an electrical installation, a source of electric energy adapted to supply energy to said installation, a movable member adapted to be moved at a speed substantially proportional to the rate of supply of energy to said installation by said source, a second movable member having a path of movement substantially coincident with that of the first mentioned movable member, means for moving said second member at a substantially uniform speed, and means whereby the engagement of said members operates to limit the amount of energy supplied to said installation by said source.

10. In an electrical installation, a source of electric energy adapted to supply energy to said installation, a movable member adapted to be moved at a speed substantially proportional to the rate of supply of energy to said installation by said source, means whereby said member is intermittently returned to an initial position, a second movable member having a path of movement substantially coincident with that of the first mentioned movable member and adapted to be moved at a substantially uniform speed, means whereby said second member is intermittently returned to an initial position, and means actuated by the engagement of said member for limiting the amount of energy supplied to said installation by said source during the times said members are in engagement.

11. In an electrical installation, a source of electric energy adapted to supply energy to said installation, means for obtaining an action responsive to an average demand in excess of a predetermined value made by said installation upon said source during any fraction of any one of a plurality of equal time intervals, and means including said last mentioned means for limiting the amount of energy supplied to said installation by said source at such times as the average demand made by the installation upon said source of energy during the preceding fraction of any one of said equal time intervals attains its predetermined value for such fraction of the time interval.

12. In an electrical installation, a source of electric energy adapted to supply energy to said installation, means including an electric meter driven element and a time actuated element for obtaining an action indicative of an average demand in excess of a predetermined value made by said installation upon said source during any fraction of any one of a plurality of equal time intervals, and means including said last mentioned means for limiting the amount of energy supplied to said installation by said source at such times as the average demand made by the installation upon said source during the preceding fraction of any one of said equal time intervals attains its predetermined value for such fraction of the time interval.

13. In an electrical installation, a principal source of electric energy adapted to supply energy to said installation, an auxiliary source of energy also adapted to supply energy to said installation, and means for causing said auxiliary source of energy to supply energy to said installation at such times as the average demand made by the installation upon said principal source of energy during the preceding fraction of any one of a plurality of equal time intervals attains a predetermined value for such fraction of the time interval.

14. In an electrical installation, a principal source of electric energy adapted to supply energy to said installation, an auxiliary source of energy also adapted to supply energy to said installation, a movable member having an initial position and adapted to be moved at a speed substantially proportional to the rate of supply of energy to said installation by said principal source, a second movable member having an initial position and a path of movement substantially coincident with that of the first mentioned movable member, means for moving said second member at a substantially uniform speed, means whereby said members are intermittently returned to their respective initial positions, and means for causing said auxiliary source of energy to supply energy to said installation whenever the ratio of the distances said members have moved from their respective initial positions attains a predetermined value.

15. In an electrical installation, a principal source of electric energy adapted to supply energy to said installation, an auxiliary source of energy also adapted to supply energy to said installation, said principal source of electric energy being normally employed to supply the total energy demand of said installation while said auxiliary source of energy normally supplies substantially no energy to said installation, a movable member adapted to be moved at a speed saubstantially proportional to the rate of supply of energy to said installation by said principal source, a second member positioned in the path of movement of said first mentioned member, and means actuated by the engagement of said members for causing said auxiliary source of energy to supply energy to said installation.

In witness whereof, I have hereunto set my hand this 29th day of July, 1914.

KARL A. PAULY.

Witnesses:
 HELEN ORFORD,
 MARGARET E. WOOLLEY.